(12) United States Patent
Chen et al.

(10) Patent No.: US 12,475,128 B2
(45) Date of Patent: *Nov. 18, 2025

(54) SEARCHING DATA ON A SYNCHRONIZATION DATA STREAM

(71) Applicant: International Business Machines Corporation, Armonk, NY (US)

(72) Inventors: Zhen Chen, Shanghai (CN); Wei Huang, Shanghai (CN); Yan Fang Ji, Wuxi (CN); Bo Tian, Shanghai (CN); Bei Bei Xu, Shanghai (CN); Miao Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/823,851

(22) Filed: Mar. 19, 2020

(65) Prior Publication Data

US 2020/0278975 A1   Sep. 3, 2020

Related U.S. Application Data

(63) Continuation of application No. 14/956,483, filed on Dec. 2, 2015, now Pat. No. 10,657,136.

(51) Int. Cl.
*G06F 16/24*   (2019.01)
*G06F 16/2453*   (2019.01)
*G06F 16/2455*   (2019.01)

(52) U.S. Cl.
CPC .... *G06F 16/24568* (2019.01); *G06F 16/2453* (2019.01)

(58) Field of Classification Search
CPC ........... G06F 16/24568; G06F 16/2453; G06F 16/9535; G06F 16/3344; G06F 16/2246

USPC ....... 707/715, 726, 728, 731, 737, 749, 759, 707/999.005, E17.002
See application file for complete search history.

(56) References Cited

U.S. PATENT DOCUMENTS 6,671,757 B1   12/2003   Multer et al.
7,260,590 B1   8/2007   Williams
8,868,590 B1   10/2014   Donneau-Golencer
(Continued)

FOREIGN PATENT DOCUMENTS

JP   3683481 B2 *   8/2005

OTHER PUBLICATIONS

ORACLE®, "Managing Files for the Hybrid Cloud; Use Cases, Challenges and Requirements," Fusion Middleware, Managed File Transfer, Oracle Technical White Paper, Jun. 2014, Copyright © 2014, Oracle and/or Its affiliates, pp. 1-12.
(Continued)

*Primary Examiner* — Md I Uddin
(74) *Attorney, Agent, or Firm* — Robert D. Bean

(57) ABSTRACT

Embodiments of the present invention disclose a method, a computer system, and computer program products. A search request is received. One of one or more search granularity classes based on the subject matter of the search request is assigned. A data synchronization stream of data records to generate a search index based on the one or more search granularity classes is indexed. Responsive to indexing a predefined number of data records associated with the assigned search granularity class, a search based on the received search request is performed.

15 Claims, 9 Drawing Sheets

(56) References Cited

U.S. PATENT DOCUMENTS

| | | | |
|---|---|---|---|
| 8,972,391 B1* | 3/2015 | McDonnell | G06F 16/337 707/727 |
| 8,984,269 B2 | 3/2015 | Ferris | |
| 9,244,978 B2 | 1/2016 | Alves et al. | |
| 9,311,410 B2 | 4/2016 | Green et al. | |
| 9,438,656 B2 | 9/2016 | Branson et al. | |
| 2004/0002988 A1 | 1/2004 | Seshadri et al. | |
| 2004/0064447 A1 | 4/2004 | Simske et al. | |
| 2007/0094241 A1* | 4/2007 | M. Blackwell | G06F 16/951 |
| 2011/0137942 A1 | 6/2011 | Yan et al. | |
| 2012/0089612 A1* | 4/2012 | Collins | H04N 1/4486 707/E17.049 |
| 2012/0331000 A1 | 12/2012 | Mehra | |
| 2013/0117317 A1 | 5/2013 | Wolf | |
| 2013/0191414 A1 | 7/2013 | Srivastava et al. | |
| 2014/0359047 A1 | 12/2014 | Lee et al. | |
| 2015/0019689 A1 | 1/2015 | Singh et al. | |
| 2015/0026159 A1* | 1/2015 | Berkman | G06F 16/9535 707/722 |
| 2015/0052220 A1 | 2/2015 | Melvin | |
| 2016/0006779 A1 | 1/2016 | Zhou et al. | |
| 2016/0085399 A1 | 3/2016 | Jain et al. | |
| 2016/0142883 A1* | 5/2016 | Zou | H04W 64/003 455/456.1 |
| 2016/0253366 A1 | 9/2016 | Hsu et al. | |
| 2016/0364693 A1* | 12/2016 | Bigini | G06Q 10/1053 |
| 2017/0161333 A1 | 6/2017 | Chen et al. | |
| 2021/0204023 A1* | 7/2021 | Knox | H04N 21/42201 |

OTHER PUBLICATIONS

ORACLE®, "Demystifying Data Integration for the Cloud," Oracle White Paper, Mar. 2015, Copyright © 2015, Oracle and/or its affiliates, pp. 1-17.

Egnyte, Inc., "Complete Feature List; HybridCloud Access and Storage," egnyte.com, Cloud File Server features: online storage, file sharing, FTP, file transfer, https://www.egnyte.com/file-server/online-file-server-features. html, Printed on Aug. 18, 2015, Copyright © 2015, Egnyte, Inc., pp. 1-9.

Mell et al., "The NIST Definition of Cloud Computing," National Institute of Standards and Technology, U.S. Department of Commerce, Special Publication 800-145, Sep. 2011, pp. 1-7.

Ballard et al., "IBM InfoSphereStreams: Harnessing Data in Motion", Information Management, Redbooks, Sep. 2010, 360 pages.

Salehi et al., "Knowing When to Slide—Efficient Scheduling for Sliding Window Processing", 2009 Tenth International Conference on Mobile Data Management: Systems, Services and Middleware, pp. 202-211.

Osman et al., "Towards Real-Time Analytics in the Cloud", 2013 IEEE Ninth World Congress on Services, pp. 428-435.

IBM: List of IBM Patents or Patent Applications Treated as Related (Appendix P), Mar. 19, 2020, 2 pages.

* cited by examiner

SEARCHING DATA ON A SYNCHRONIZATION DATA STREAM

BACKGROUND OF THE INVENTION

The present invention relates generally to the field of data stream analytics, and more particularly, to maintaining a search index for searching near-real time data under a high throughput environment.

SUMMARY

Embodiments of the present invention disclose a method, a computer system, and computer program products. A search request is received. One of one or more search granularity classes based on the subject matter of the search request is assigned. A data synchronization stream of data records to generate a search index based on the one or more search granularity classes is indexed. Responsive to indexing a predefined number of data records associated with the assigned search granularity class, a search based on the received search request is performed.

DETAILED DESCRIPTION

Figure 1:
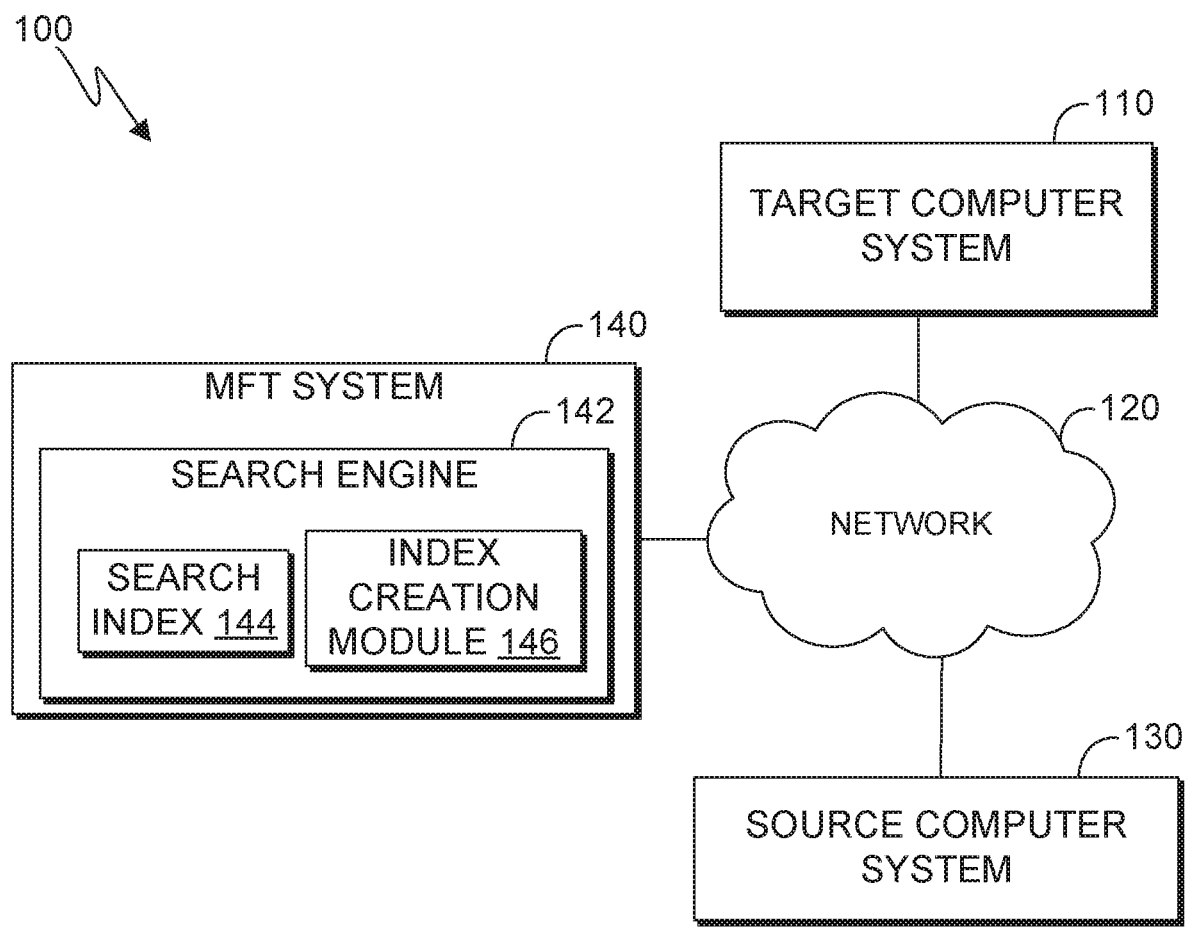
FIG. 1 is a block diagram of a synchronization data stream searching environment, in accordance with an embodiment of the present invention.

Computer systems implemented in a cloud environment can be used to initiate, monitor, and manage a data synchronization process to access data that can be requested by a target computer system. The data synchronization process may involve synchronizing a large amount data, including legacy data and incoming data streams, from a source computer system to a target computer system.

During a data synchronization process, a computer system can index a synchronization data stream to generate a search index. As a search index is generated, a received search request can be analyzed by the computer system to define one or more search granularity classes associated with the received search request. For example, a computer system, such as a managed file transfer (MFT) system, may receive a search request from a target computer system, where the target computer system is requesting near-real time access to data stored in one or more computer systems of the cloud environment, as well as near-real time access to data from a synchronization data stream. The phrase, "search granularity class," as used herein, refers to a category or class of a search request, based on a subject matter of the search request. After a search granularity class is defined, a search granularity size can be determined that is associated with the defined search granularity class, where the search granularity size indicates a number of data records to be received for the defined search granularity class to perform a search based on a received search request.

A search granularity status can be associated with a defined search granularity class, where the search granularity status indicates whether a received search request can be performed (i.e., perform a search based on the received search request), based on a number of data records received for the defined search granularity class. In certain instances, a computer system can receive more than one search request at a time, which may result in defining more than one search granularity class. In instances involving more than one defined search granularity class, a hash-code map can be implemented by a computer system to manage the more than one defined search granularity class.

In general, synchronization data stream analytics, such as searching a synchronization data stream, can be performed on a cloud environment that involves movement of structured data from a computer system. In this exemplary embodiment, an MFT system can be implemented in the cloud environment. It should be understood that, although the exemplary embodiment involves a cloud environment that implements an MFT system, other computer systems can be implemented in the cloud environment, such that data stream analytics can be performed. For example, data stream analytics can be performed on a cloud environment which involves data movement from an online transactional processing (OLTP) computer system to an online analytical processing (OLAP) computer system.

Embodiments of the present invention provide systems, methods, and computer program products for performing searches on data from a synchronization data stream at near-real time. Embodiments of the present invention can provide users of computer systems in a cloud environment with access to search request results in near-real time during a data synchronization process.

FIG. 1 is a functional block diagram of synchronization data stream searching environment 100, in accordance with an embodiment of the present invention. Synchronization data stream searching environment 100 includes target computer system 110, source computer system 130, and MFT system 140, which are connected via network 120. As previously described, MFT system 140 can be another computer system, such as a monitoring computer system, in accordance with an embodiment of the present invention. Target computer system 110, source computer system 130, and MFT system 140 can be desktop computers, laptop computers, specialized computer servers, or any other computer systems known in the art, in accordance with an embodiment of the present invention. In certain embodiments, target computer system 110, source computer system 130, and MFT system 140 represent computer systems utilizing clustered computers and components to act as a single pool of seamless resources when accessed through network 120. In general, target computer system 110, source computer system 130, and MFT system 140 are representative of any electronic devices or combination of electronic devices, capable of executing machine-readable program instructions in accordance with an embodiment of the present invention, as described in greater detail with regard to FIG. 7. In other embodiments, target computer system 110, source computer system 130, and MFT system 140 may be implemented in a cloud computing environment, as described in greater detail with regard to FIGS. 8 and 9.

Source computer system 130 represents a platform containing data that can be transmitted from source computer system 130 as a part of a synchronization data stream. For example, source computer system 130 can be a part of an on premise enterprise computing environment, such as a warehouse management center that manages existing data as well as incoming data streams. Existing data of the warehouse management center may include client records, previously executed inventory transactions, logistical procedures, risk management protocol, etc. Incoming data streams may be received by the warehouse management center, such as updates of inventory statuses, incoming purchase orders, incoming reports for forecasting inventory demand, etc.

Target computer system 110 represents a platform that receives information stored on source computer system 130. In one embodiment, a user of target computer system 110 can submit a search request. In another embodiment, target computer system 110 may automatically transmit a search request based on a schedule and/or other conditions specified by an administrative user of target computer system 110. In an exemplary embodiment, a search request can include an alert search request, a node search request, a process search request, and rule search request. An alert search request may involve a request to receive a notification, such as a message, that describes an event meeting criteria that is specified by the alert search request. A process search request may involve a request to receive a notification that describes parameters for data synchronization activity, such as moving particular files between source computer system 130 and target computer system 110, ongoing processes, programs, and commands, monitoring and controlling processes, handling of processing errors. A rule search request may involve a request to receive a list of attributes for data that is involved in a data synchronization process, such as a file name, file type or file extension, dates, owner, a container name associated with the data, etc. A node search request may involve a request to receive monitoring information for node, such as a computer system.

MFT system 140 represents a platform that manages a data synchronization process. As previously described, MFT system 140 can represent any platform, service, or computer system that monitors a data synchronization process. For example, MFT system 140 can be a monitoring service that monitors a synchronization data stream, where the synchronization data stream is initiated by a separate computer system (not depicted). In one embodiment, MFT system 140 initiates a process to receive a synchronization data stream. MFT system 140 may also implement additional components to define a search granularity class based on a received search request, index data from the synchronization data stream, and perform the received search request, as described in greater detail below. In certain embodiments, MFT system 140 determines an order in which synchronization data streams are initiated, based on a weight matrix. For example, a weight matrix can be implemented to identify a synchronization data stream to initiate, based on a number of data records in the identified synchronization data stream that are associated with a defined search granularity class for a received search request.

Search engine 142 represents an application configured to perform received search requests that are transmitted by target computer system 110. In this embodiment, search engine 142 defines a search granularity class for a received search request.

Search index 144 represents a one or more data structures referenced by search engine 142 that contains indexed data from a synchronization data stream received by MFT system 140. For example, data can be indexed with respect to one or more defined search granularity classes. In certain embodiments, search index 144 may include a hash-code map that is configured to maintain information for multiple search granularity classes that are being processed by search engine 142 concurrently.

Search index creation module 146 represents a module that generates search index 144. Search index creation module 146 can analyze synchronization data streams received by MFT system 140 and index the data from the synchronization data streams by generating search index 144.

Network 120 can be, for example, a local area network (LAN), a wide area network (WAN) such as the Internet, or a combination of the two, and include wired, wireless, or fiber optic connections. In general, network 120 can be any combination of connections and protocols that will support communications between target computer system 110, source computer system 130, and MFT system 140, in accordance with a desired embodiment of the invention.

Embodiments of the invention are described with respect to the components and their functionality as presented in FIG. 1. Other embodiments of the invention may perform the invention as claimed with different functional boundaries between components. For example, the functionality of search engine 142 and components therein may be implemented as a part of a standalone component, or may be incorporated as a function of source computer system 130 and/or target computer system 110. In another example, MFT system 140 can represent one or more computer systems that are configured to monitor a data synchronization stream in synchronization data stream searching environment 100.

Figure 2A:
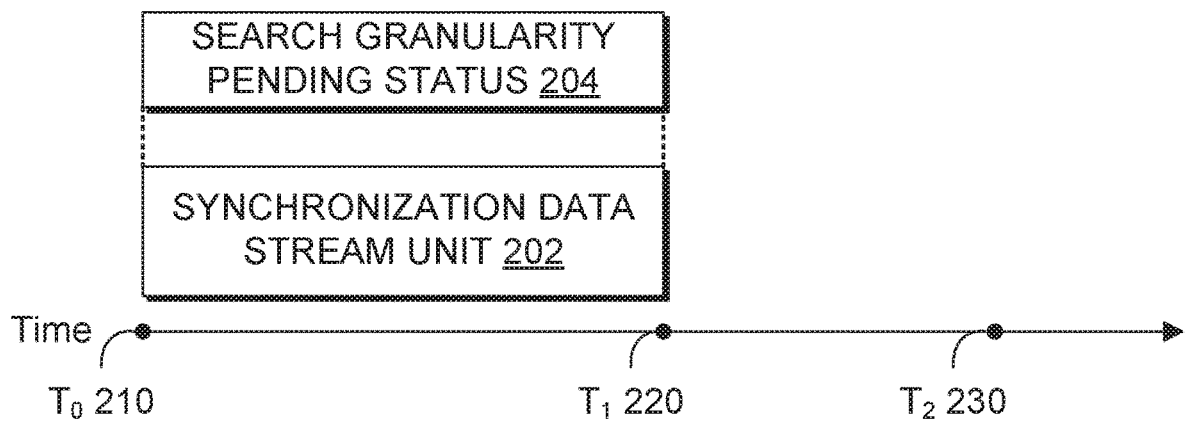
FIGS. 2A and 2B are block diagrams of synchronization data streams, in accordance with an embodiment of the present invention.
Figure 2B:
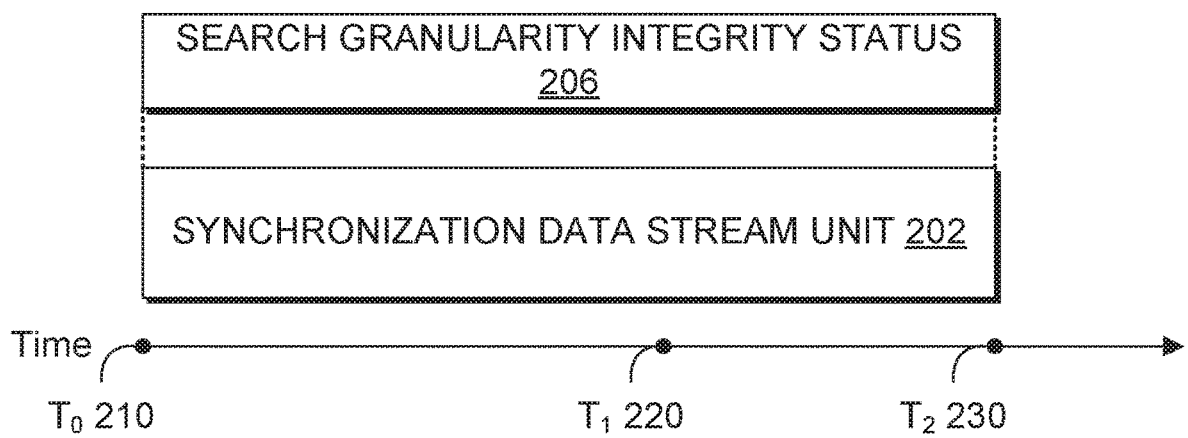

FIGS. 2A and 2B are block diagrams of synchronization data stream unit 202, in accordance with an embodiment of the present invention. In this embodiment, synchronization data stream unit 202 includes a set of data records that are a part of a data synchronization process managed by MFT system 140 from time $T_0$ 210 to time $T_2$ 230. For example, search engine 142 can receive an alert search request, define an alert search granularity class from the received alert search request, and receive data records for the defined alert search granularity class that are contained in synchronization data stream unit 202 or indexed in search index 144, until a determined search granularity size is met. In one embodiment data stream unit 202 may be initiated at time $T_0$ 210, responsive to search engine 142 receiving a search request. In another embodiment, a search request may be received at a time after synchronization data stream unit 202 is initiated. As previously described, a search granularity status indicates whether a received search request can be performed, based on a number of data records received for the defined search granularity class. For example, a search granularity status for a defined search granularity class can have an integrity status, pending status, or an inactive status. A search granularity integrity status indicates that a determined granularity size for a defined search granularity class has been met. A search granularity pending status indicates that a determined granularity size for a defined search granularity class has not yet been met. A search granularity inactive status indicates that no data records indexed in search index 144 or in a synchronization data stream unit, such as synchronization data stream unit 202, can be received. In this exemplary embodiment, MFT system 140 is implemented, but it should be understood that, in other embodiments one or more computer systems can be implemented to manage synchronization data stream unit 202, as previously described.

In FIG. 2A, search engine 142 determines that a determined search granularity size for a defined search granularity class has not been met. For example, search engine 142 may analyze a defined search granularity class to determine that a search granularity size for the defined search granularity class is 500 data records. At time $T_1$ 220, search engine 142 may only receive 300 data records for the defined search granularity class. After time $T_1$ 220, search engine 142 can assign to the defined search granularity class a search granularity pending status 204. Accordingly, search granularity pending status 204 indicates that search engine 142 should continue processing synchronization data stream unit 202 and receive data records for the defined search granularity class until a determined search granularity size is met (e.g., 500 data records).

In FIG. 2B, search engine 142 determines that a determined search granularity size for a defined search granularity class is met. For example, search engine 142 may analyze a defined search granularity class to determine that a search granularity size for the defined search granularity class is 500 data records. At time $T_2$ 230, search engine 142 may receive 500 data records for the defined search granularity class. After time $T_2$ 230, search engine 142 can assign to the defined search granularity class a search granularity integrity status 206. Accordingly, search granularity integrity status 206 indicates that search engine 142 can perform a received search request associated with the defined search granularity class.

Figure 3:
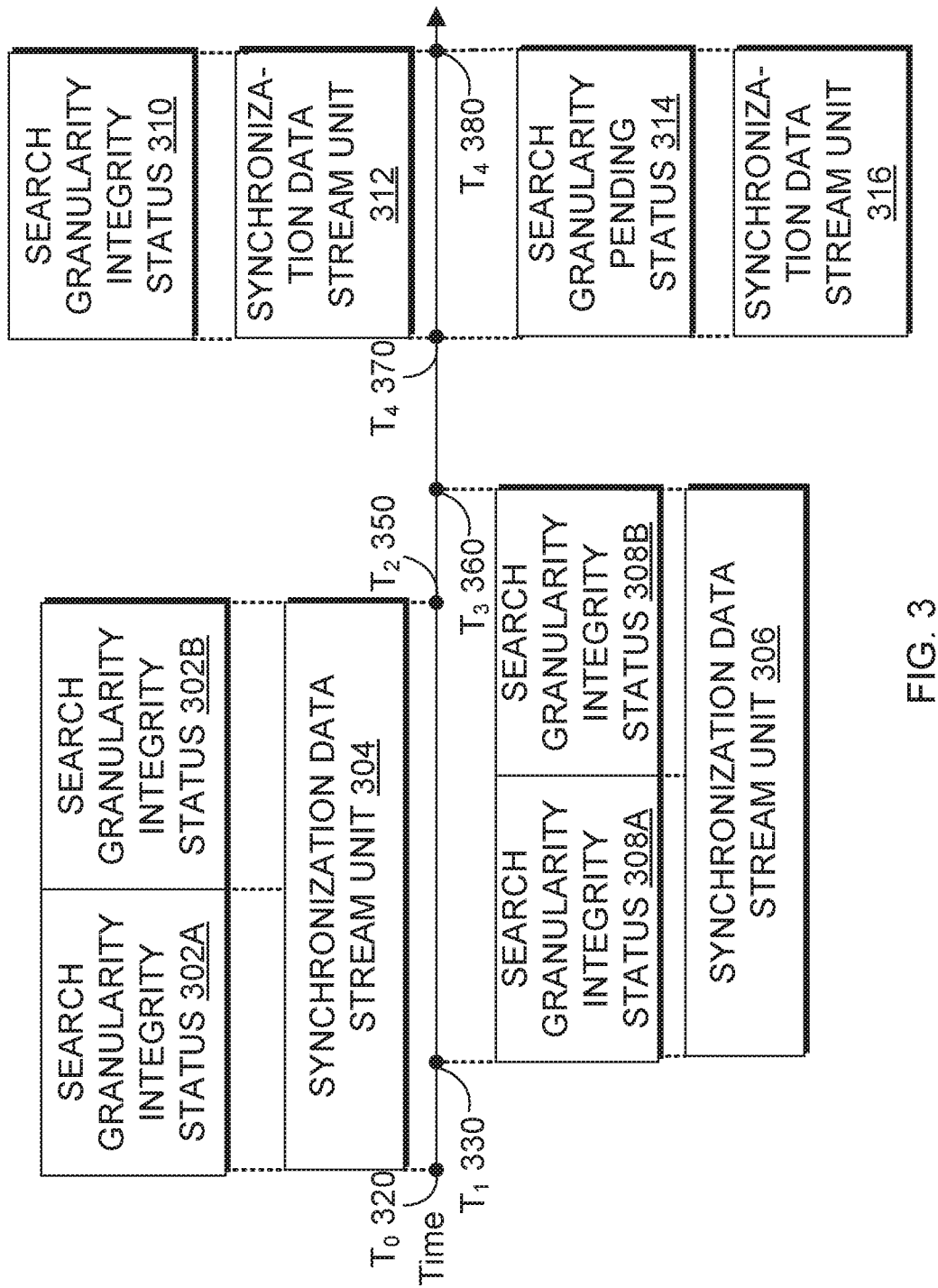
FIG. 3 is a block diagram of concurrent synchronization data streams, in accordance with an embodiment of the present invention.

FIG. 3 is a block diagram depicting synchronization data streams that are managed concurrently and associated search granularity statuses, in accordance with an embodiment of the present invention. In this embodiment, search engine 142 receives more than one search request from time $T_0$ 320 to time $T_4$ 380. Search engine 142 may define more than one search granularity class from the more than one received search request, resulting in one search granularity status for each of the more than one defined search granularity classes. In another embodiment, more than one search granularity class can be defined from one received search request by search engine 142, resulting a search granularity status for each of the more than one defined search granularity classes. Search engine 142 can assign a search granularity status for a respective search granularity class, based on a number of data records received for the respective search granularity class associated with one of synchronization data stream units 304-316. In certain embodiments, a hash-code map may be implemented by search engine 142 to help manage multiple search granularity classes, as described in greater detail with regard to FIG. 4. In this exemplary embodiment, MFT system 140 is implemented, but it should be understood that, in other embodiments one or more computer systems can be implemented to manage synchronization data stream units 304-316, as previously described.

From time $T_0$ 320 to time $T_3$ 360, a portion of synchronization data stream unit 304 and a portion of synchronization data stream unit 306 are processed concurrently. Synchronization data stream unit 304 as well as synchronization data stream unit 306 can be associated with two subsets of search granularity classes having search granularity integrity status 302A, search granularity integrity status 302B, and search granularity integrity status 308A, search granularity integrity status 308B, respectively. Accordingly, a received search request associated with synchronization data stream unit 304 and/or synchronization data stream unit 306 can be performed by search engine 142.

At time $T_4$ 370, synchronization data stream unit 312 and synchronization data stream unit 316 are processed at a same time. In this embodiment, at time $T_5$ 380, synchronization data stream unit 312 is assigned a search granularity status of search granularity integrity status 310, indicating that a received search request associated with synchronization data stream unit 312 can be performed. Search engine 142 may determine that a determined granularity size for a defined search granularity class associated with synchronization data stream unit 316 is not met. Accordingly, search engine 142 determines that a received search request associated with the defined search granularity class cannot be performed and is assigned a search granularity status of search granularity pending status 314.

Figure 4:
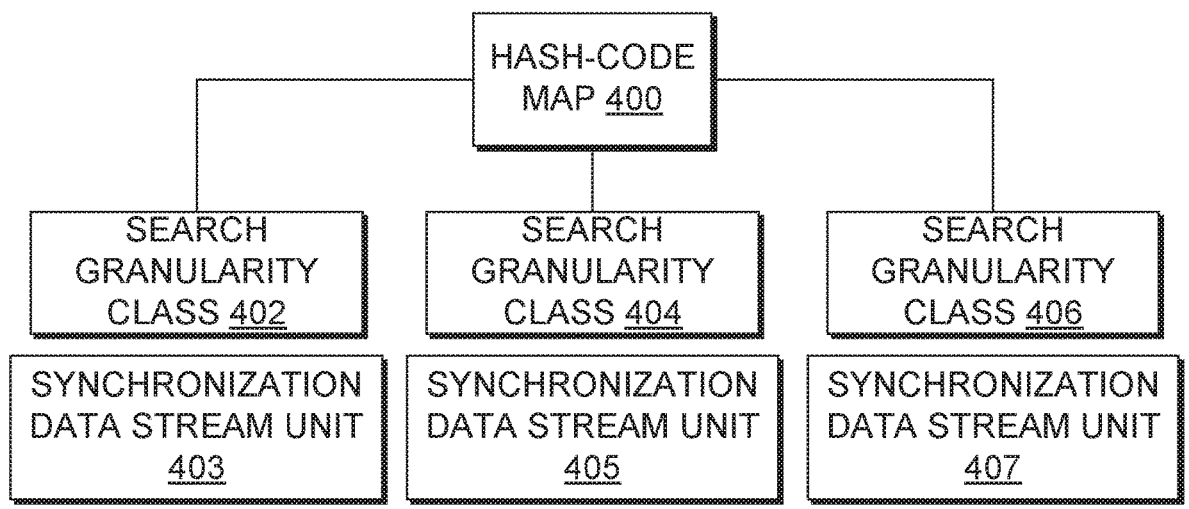
FIG. 4 is a block diagram illustrating a hash map for more than one search granularity class.

FIG. 4 is a block diagram illustrating hash-code map 400 that is implemented by search engine 142 to help manage more than one search granularity class that are being processed at a same time. In certain instances, a received search request can be associated with a number of defined search granularity classes, each having a large granularity size. Search engine 142 can manage the received search request, by generating sub-sets for each of the defined search granularity classes, and implementing hash-code map 400 to manage each of the generated sub-sets. In this embodiment, a hash function can be applied to each of search granularity class 402, search granularity class 404 and search granularity 406 to populate a table included in hash-code map 400. Each of respective hash code can identify an associated synchronization data stream unit that is managed by MFT system 140. For example, hash-code map 400 may be referenced to determine that synchronization data stream unit 403, synchronization data stream unit 405, and synchronization data stream unit 407 are associated with search granularity class 402, search granularity class 404, and search granularity class 406, respectively. In this exemplary embodiment, MFT system 140 is implemented, but it should be understood that in other embodiments, one or more computer systems can implement hash-code map 400, as previously described.

Figure 5:
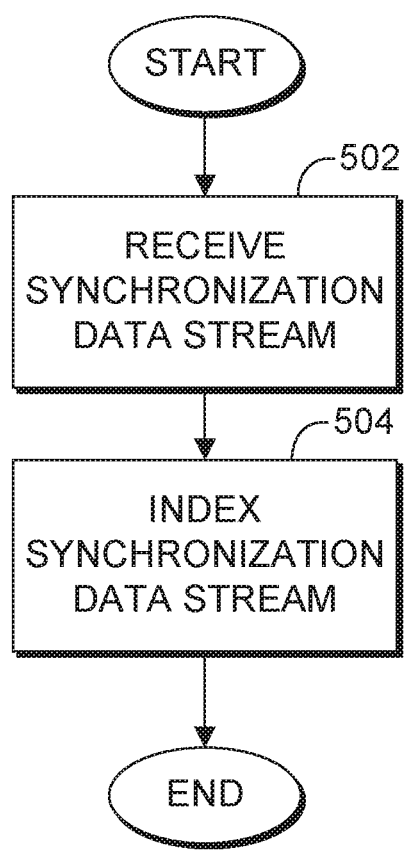
FIG. 5 is a flowchart illustrating operational steps for creating a search index, in accordance with an embodiment of the present invention.

FIG. 5 is a flowchart illustrating operational steps for creating search index 144, in accordance with an embodiment of the present invention. In one embodiment, a synchronization data stream has been previously initiated by MFT system 140. In another embodiment, prior to initiating a synchronization data stream, a weight matrix may be implemented by MFT system 140 to initiate a synchronization data stream that is identified, as previously described. In general, search index 144 is generated in real-time, as a synchronization data stream is being managed a monitoring computer system, such as MFT system 140.

Search index creation module 146 receives a synchronization data stream that is initiated by MFT system 140 (step 502). While search index creation module 144 receives the synchronization data stream, search index creation module 146 can analyze the received synchronization data stream to index data records of the synchronization data stream with respect to defined search granularity classes (step 504). Accordingly search index 144 can be referenced by search engine 142 to perform a received search request, as described in greater detail with regard to FIG. 6.

Figure 6:
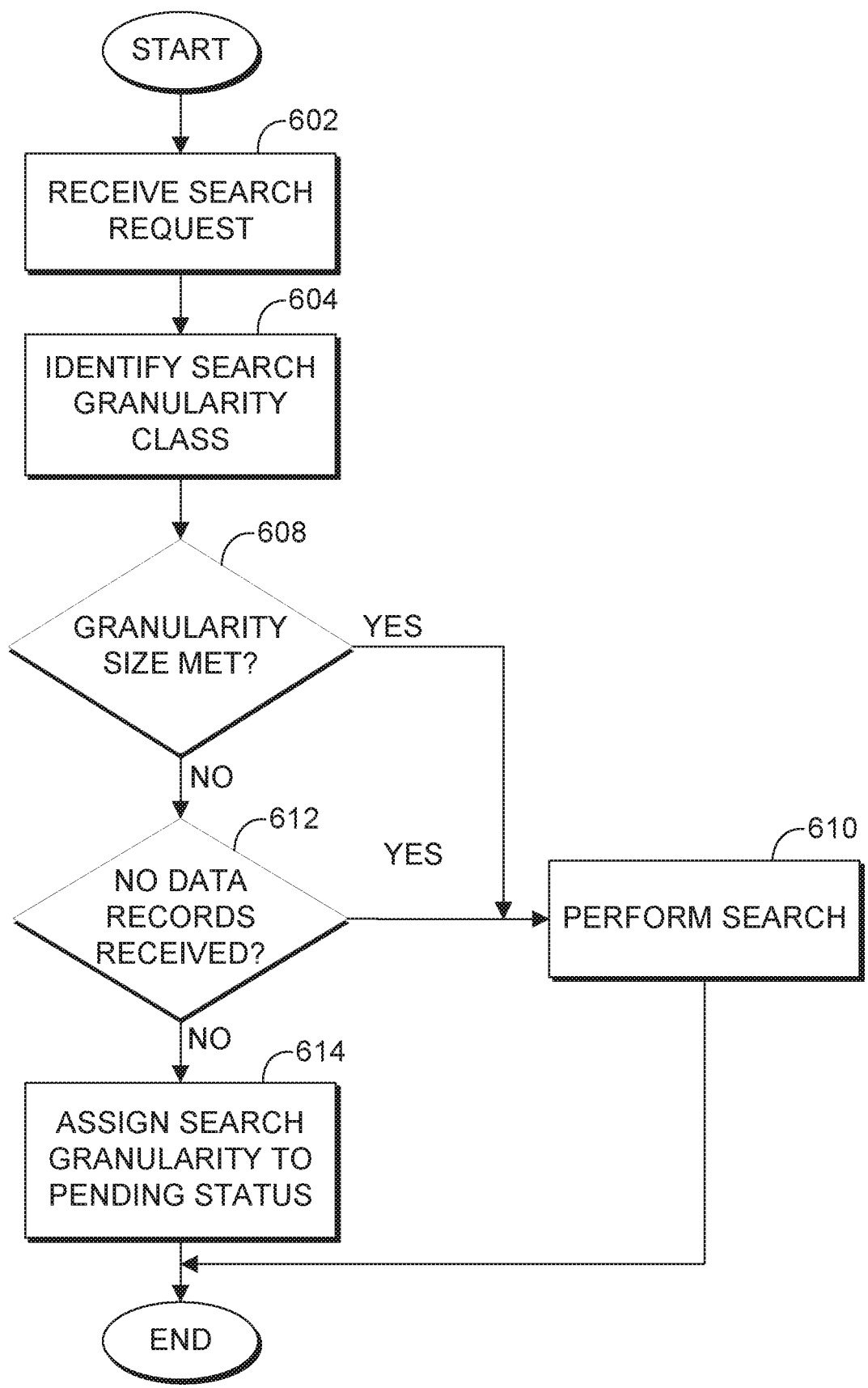
FIG. 6 is a flowchart illustrating operational steps for performing a search, in accordance with an embodiment of the present invention.

FIG. 6 is a flowchart illustrating operational steps for performing a search, in accordance with an embodiment of the present invention. Search engine 142 can receive a search request from target computer system 110 (step 602). After receiving a search request, search engine 142 defines a search granularity class that is associated with the received search request (step 604).

After a search granularity class is defined by search engine 142, search engine 142 determines whether a granularity size for the defined search granularity class is met (decision 608). If, search engine 142 determines that the granularity size for the defined search granularity class is met (decision 608, "Yes" branch), then search engine 142 performs the received search request that is associated with the defined search granularity class (step 610). In this embodiment, if the granularity size for the defined search granularity class is met, then the defined search granularity class is assigned a search granularity integrity status. If, search engine 142 determines that the granularity size for the defined search granularity class is not met (decision 608, "No" branch), then search engine 142 determines whether no data records for the defined search granularity class in a synchronization data stream or indexed in search index 144 are received (decision 612). If, search engine 142 determines that no data records for the defined search granularity class are received (decision 612, "Yes" branch), then search engine 142 performs the received search request that is associated with the defined search granularity class (step 610). If, search engine 142 determines that data records for the defined search granularity class are received, but do not meet a search granularity size for the defined search granularity class (decision 612, "No" branch), then search engine 142 assigns a search granularity pending status to the defined search granularity class (step 614). In this instance, the identified search granularity continues to be processed until search engine 142 determines that the identified search granularity class is of a search granularity integrity status, or that the received search request is ready to be performed.

Figure 7:
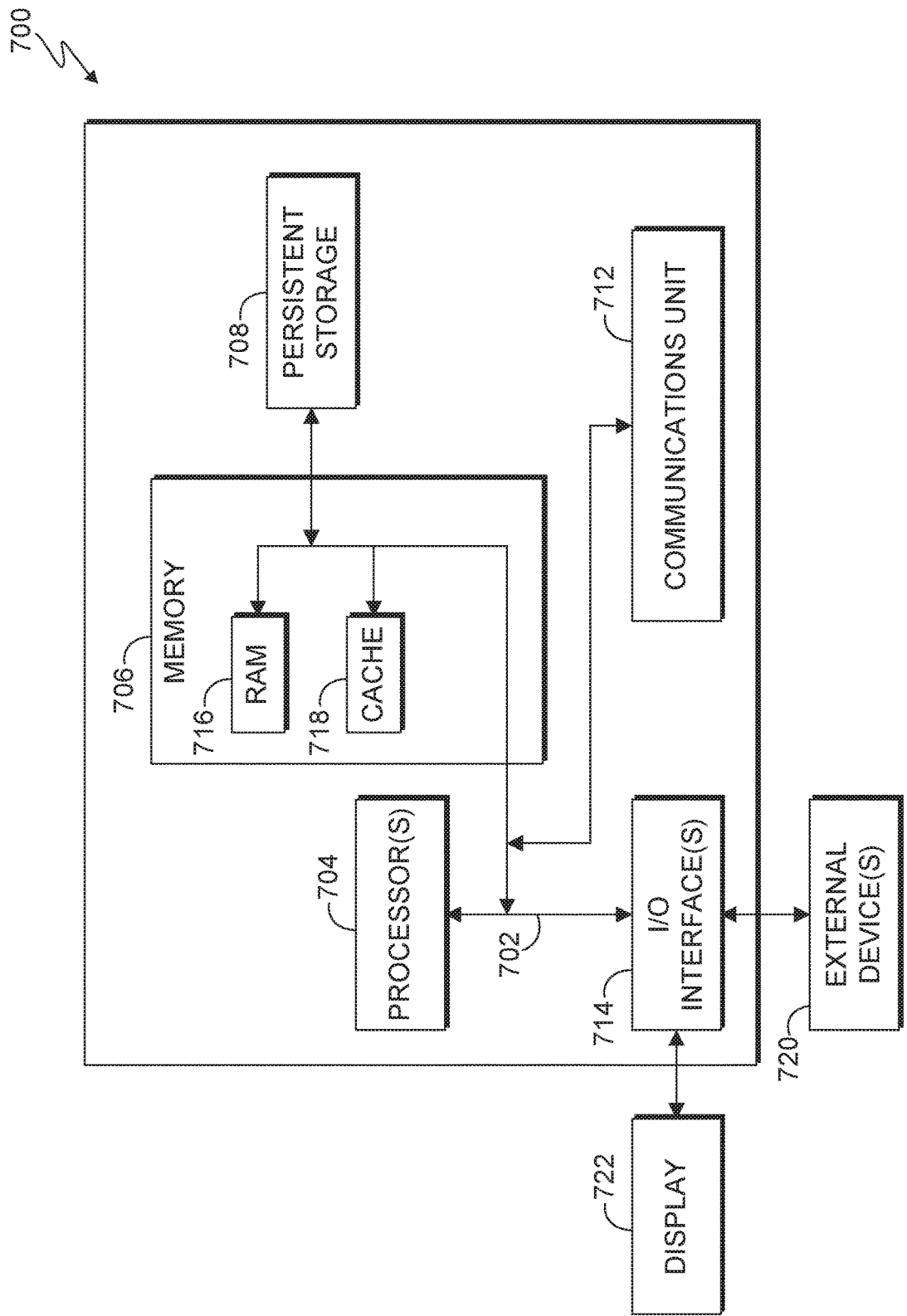
FIG. 7 is a block diagram of internal and external components of the computer systems of FIG. 1, in accordance with an embodiment of the present invention.

FIG. 7 is a block diagram of internal and external components of a computer system 700, which is representative the computer systems of FIG. 1, in accordance with an embodiment of the present invention. It should be appreciated that FIG. 7 provides only an illustration of one implementation and does not imply any limitations with regard to the environments in which different embodiments may be implemented. In general, the components illustrated in FIG. 6 are representative of any electronic device capable of executing machine-readable program instructions. Examples of computer systems, environments, and/or configurations that may be represented by the components illustrated in FIG. 7 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 700 includes communications fabric 702, which provides for communications between one or more processors 704, memory 706, persistent storage 708, communications unit 712, and one or more input/output (I/O) interfaces 714. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 716 and cache memory 718. In general, memory 706 can include any suitable volatile or non-volatile computer-readable storage media. Software is stored in persistent storage 708 for execution and/or access by one or more of the respective processors 704 via one or more memories of memory 706.

Persistent storage 708 may include, for example, a plurality of magnetic hard disk drives. Alternatively, or in addition to magnetic hard disk drives, persistent storage 708 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 708 can also be removable. For example, a removable hard drive can be used for persistent storage 708. Other examples include optical and magnetic disks, thumb drives, and smart cards that are inserted into a drive for transfer onto another computer-readable storage medium that is also part of persistent storage 708.

Communications unit 712 provides for communications with other computer systems or devices via a network (e.g., network 120). In this exemplary embodiment, communications unit 712 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 712 (e.g., via the Internet, a local area network or other wide area network). From communications unit 712, the software and data can be loaded onto persistent storage 708.

One or more I/O interfaces 714 allow for input and output of data with other devices that may be connected to computer system 700. For example, I/O interface 714 can provide a connection to one or more external devices 720, such as a keyboard, computer mouse, touch screen, virtual keyboard, touch pad, pointing device, or other human interface devices. External devices 720 can also include portable computer-readable storage media such as, for example, thumb drives, portable optical or magnetic disks, and memory cards. I/O interface 714 also connects to display 722.

Display 722 provides a mechanism to display data to a user and can be, for example, a computer monitor. Display 722 can also be an incorporated display and may function as a touch screen, such as a built-in display of a tablet computer.

Figure 8:
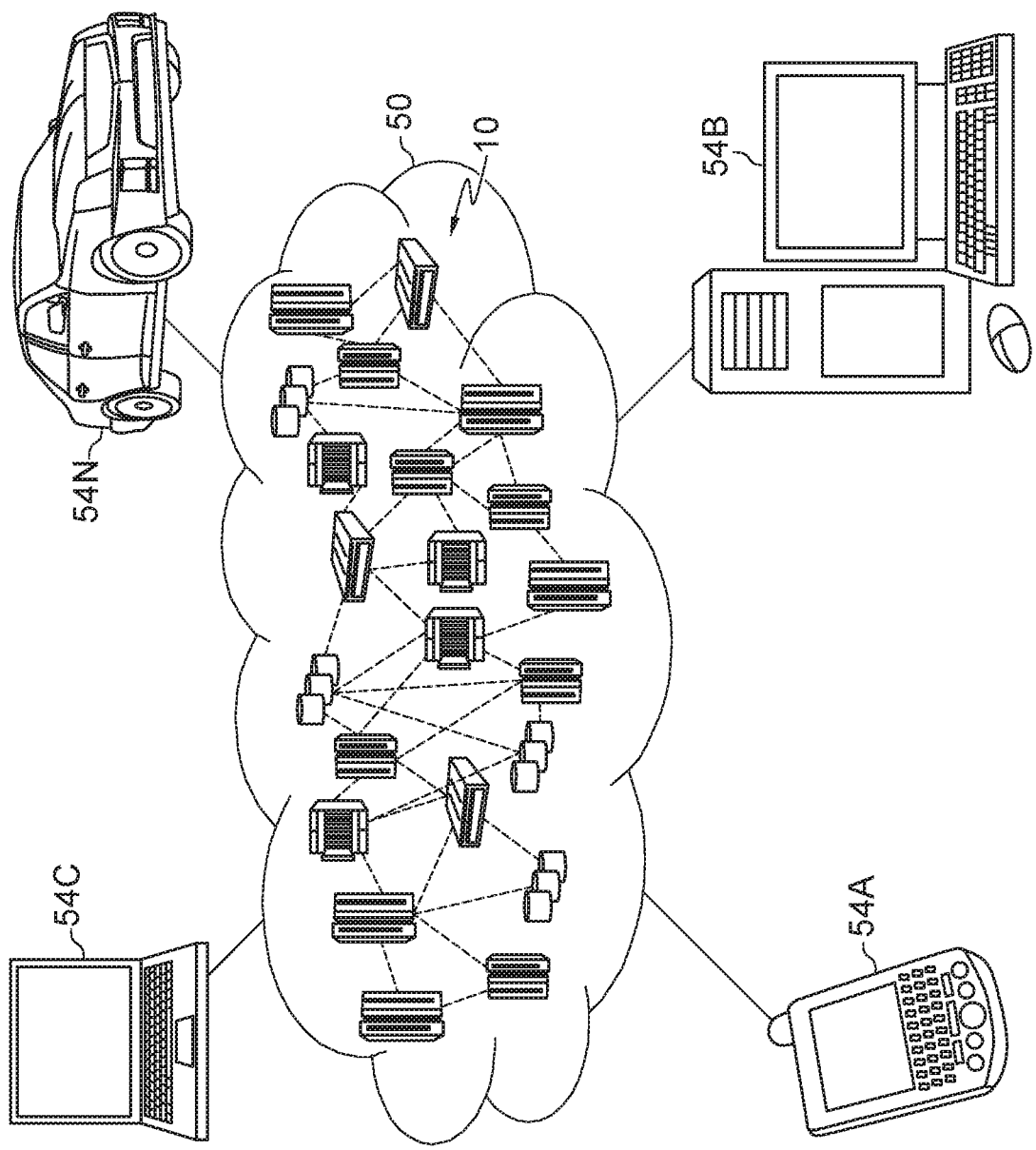
FIG. 8 depicts a cloud computing environment according to an embodiment of the present invention.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that cloud computing nodes 10 and cloud computing environment 50 can communicate with any type of computerized device over any type of network and/or network addressable connection (e.g., using a web browser).

Figure 9:
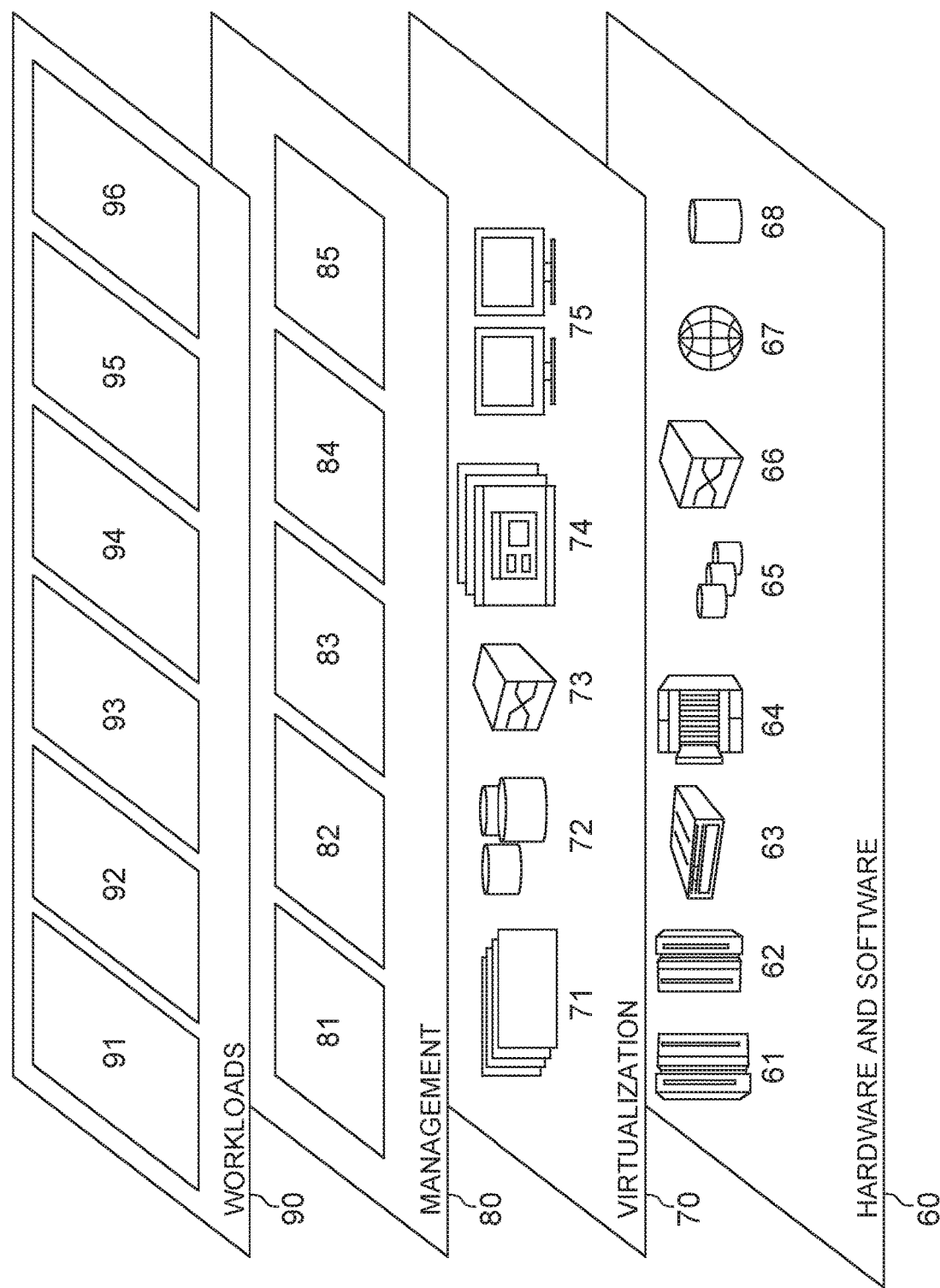
FIG. 9 depicts abstraction model layers, in accordance with an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and synchronization data stream searching environment 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in FIGS. 1-9 illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in FIGS. 1-9. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure comprising a network of interconnected nodes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for performing a search on data records within a synchronization data stream, the method comprising:
    defining one or more search granularity classes, wherein the search granularity classes comprise categories of search request which are based on a subject matter of one or more received search requests;
    indexing, in real-time during the synchronization data stream, one or more additional data records within the synchronization data stream based on the one or more defined search granularity classes;
    initializing one or more synchronization data streams based on a weight matrix, wherein the weight matrix is based on a number of data records in the one or more synchronization data streams associated with the one or more search granularity classes; and
    in response to the one or more defined search granularity classes comprising a plurality of data records that meet a search granularity size associated with the one or more search granularity classes and the search granularity class is of a search granularity integrity status or that the received search request is ready to be performed, executing a search of the plurality of data records.

2. The method of claim 1, further comprising:
    responsive to receiving more than one search request during the data synchronization stream, defining one or more of the search granularity classes for the more than one search requests based on a type of a respective search request.

3. The method of claim 2, further comprising:
    for the one or more search granularity classes associated with an identified search request:
    generating a second synchronization data stream unit including at least a portion of the data records from the plurality of synchronization data streams, wherein the second synchronization data stream unit corresponds to a respective search granularity class associated with the identified search request and is associated with a search granularity size indicating a defined number of the data records from the plurality of synchronization data streams to be included in the second synchronization data stream unit;
    determining whether the second synchronization data stream unit includes at least the defined number of the data records indicated by the search granularity size of the respective search granularity class associated with the second synchronization data stream unit; and
    responsive to determining that the second synchronization data stream unit includes at least the defined number of the data records indicated by the search granularity size of the respective search granularity class associated with the second synchronization data stream unit, performing a search on the data records included in the second synchronization data stream unit, based on the identified search request.

4. The method of claim 2, further comprising:
    generating a hash-code map to manage the more than one received search requests.

5. The method of claim 1, further comprising:
    identifying one of the more than one search requests based on a weight matrix, such that a search based on the identified search request is performed at a first time.

6. A computer program product for performing a search on data records within a synchronization data stream, the computer program product comprising:
    one or more tangible computer-readable storage devices and program instructions stored on at least one of the one or more tangible computer-readable storage devices, the program instructions executable by a processor capable of performing a method, the method comprising:
    defining one or more search granularity classes, wherein the search granularity classes comprise categories of search request which are based on a subject matter of one or more received search requests;
    indexing, in real-time during the synchronization data stream, one or more additional data records within the synchronization data stream based on the one or more defined search granularity classes;
    initializing one or more synchronization data streams based on a weight matrix, wherein the weight matrix is based on a number of data records in the one or more synchronization data streams associated with the one or more search granularity classes; and
    in response to the one or more defined search granularity classes comprising a plurality of data records that meet a search granularity size associated with the one or more search granularity classes and the search granularity class is of a search granularity integrity status or that the received search request is ready to be performed, executing a search of the plurality of data records.

7. The computer program product of claim 6, further comprising:
    responsive to receiving more than one search request during the data synchronization stream, defining one or more of the search granularity classes for the more than one search requests based on a type of a respective search request.

8. The computer program product of claim 7, further comprising:
    for one or more of the search granularity classes associated with an identified search request:
    generating a second synchronization data stream unit including at least a portion of the data records from the plurality of synchronization data streams, wherein the second synchronization data stream unit corresponds to a respective search granularity class associated with the identified search request and is associated with a search granularity size indicating a defined number of the data records from the plurality of synchronization data streams to be included in the second synchronization data stream unit;

determining whether the second synchronization data stream unit includes at least the defined number of the data records indicated by the search granularity size of the respective search granularity class associated with the second synchronization data stream unit; and responsive to determining that the second synchronization data stream unit includes at least the defined number of the data records indicated by the search granularity size of the respective search granularity class associated with the second synchronization data stream unit, performing a search on the data records included in the second synchronization data stream unit, based on the identified search request.

9. The computer program product of claim 7, further comprising:

generating a hash-code map to manage the more than one received search requests.

10. The computer program product of claim 6, further comprising:

identifying one of the more than one search requests based on a weight matrix, such that a search based on the identified search request is performed at a first time.

11. A computer system for performing a search on data records within a synchronization data stream, the computer system comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

defining one or more search granularity classes, wherein the search granularity classes comprise categories of search request which are based on a subject matter of one or more received search requests;

indexing, in real-time during the synchronization data stream, one or more additional data records within the synchronization data stream based on the one or more defined search granularity classes;

initializing one or more synchronization data streams based on a weight matrix, wherein the weight matrix is based on a number of data records in the one or more synchronization data streams associated with the one or more search granularity classes; and in response to the one or more defined search granularity classes comprising a plurality of data records that meet a search granularity size associated with the one or more search granularity classes and the search granularity class is of a search granularity integrity status or that the received search request is ready to be performed, executing a search of the plurality of data records.

12. The computer system of claim 11, further comprising:

responsive to receiving more than one search request during the data synchronization stream, defining one or more of the search granularity classes for the more than one search requests based on a type of a respective search request.

13. The computer system of claim 12, further comprising:

for one or more of the search granularity classes associated with an identified search request:

generating a second synchronization data stream unit including at least a portion of the data records from the plurality of synchronization data streams, wherein the second synchronization data stream unit corresponds to a respective search granularity class associated with the identified search request and is associated with a search granularity size indicating a defined number of the data records from the plurality of synchronization data streams to be included in the second synchronization data stream unit;

determining whether the second synchronization data stream unit includes at least the defined number of the data records indicated by the search granularity size of the respective search granularity class associated with the second synchronization data stream unit; and responsive to determining that the second synchronization data stream unit includes at least the defined number of the data records indicated by the search granularity size of the respective search granularity class associated with the second synchronization data stream unit, performing a search on the data records included in the second synchronization data stream unit, based on the identified search request.

14. The computer system of claim 12, further comprising:

generating a hash-code map to manage the more than one received search requests.

15. The computer system of claim 11, further comprising:

identifying one of the more than one search requests based on a weight matrix, such that a search based on the identified search request is performed at a first time.

* * * * *